(12) United States Patent
Danilo (10) Patent No.: US 11,167,159 B2
(45) Date of Patent: Nov. 9, 2021

(54) CABIN MODULE AND MOTOR VEHICLE EQUIPPED WITH SAME

(71) Applicant: Rosenbauer International AG, Leonding (AT)

(72) Inventor: Kmetec Danilo, Maribor (SI)

(73) Assignee: Rosenbauer International AG, Leonding (AT)

( * ) Notice: Subject to any disclaimer, the term of this patent is extended or adjusted under 35 U.S.C. 154(b) by 227 days.

(21) Appl. No.: 16/488,691

(22) PCT Filed: Mar. 23, 2018

(86) PCT No.: PCT/EP2018/057471
§ 371 (c)(1),
(2) Date: Aug. 26, 2019

(87) PCT Pub. No.: WO2018/172530
PCT Pub. Date: Sep. 27, 2018

(65) Prior Publication Data
US 2021/0205644 A1     Jul. 8, 2021

(30) Foreign Application Priority Data
Mar. 24, 2017  (AT) .............................. A 50239/2017

(51) Int. Cl.
*A62C 27/00*         (2006.01)
*B62D 33/06*         (2006.01)
(Continued)

(52) U.S. Cl.
CPC .............. *A62C 27/00* (2013.01); *B62D 33/06* (2013.01); *B65D 85/68* (2013.01); *B62D 33/046* (2013.01)

(58) Field of Classification Search
CPC .......................... B62D 33/06; B62D 33/0621; B62D 33/0617; B62D 33/0612; B62D 29/043; B62D 29/046; A47C 27/00
(Continued)

(56) References Cited

U.S. PATENT DOCUMENTS 2,815,243 A  *  12/1957  Campbell .................. B60J 1/14
                                                    296/190.11
3,496,689 A      2/1970  Nerem
(Continued)

FOREIGN PATENT DOCUMENTS

CN           1954125 B  *  2/2011  ........... E04H 1/1205
CN          205203146 U      5/2016
(Continued)

OTHER PUBLICATIONS

International Search Report in PCT/EP2018/057471, dated Jul. 10, 2018.
(Continued)

*Primary Examiner* — D Glenn Dayoan
*Assistant Examiner* — Kevin P Weldon
(74) *Attorney, Agent, or Firm* — Collard & Roe, P.C.

(57) ABSTRACT

A cabin module has the form of a self-supporting structural body of multiple walls which delimit a cabin area. The walls are made of a continuous blank, wherein in the edge regions of walls directly following one another, the outer layer is in each case designed to be continuous and deformed, and the inner layer is interrupted by a separating section. At least one first lateral wall, a base wall, a second lateral wall, and a roof wall are provided. End sections of the blank are connected to one another when the walls are erected. A motor vehicle is equipped with such a cabin module.

15 Claims, 3 Drawing Sheets

(51) Int. Cl.
  *B65D 85/68* (2006.01)
  *B62D 33/04* (2006.01)
(58) Field of Classification Search
  USPC ........................................ 296/190.01, 190.08
  See application file for complete search history.

(56) References Cited

U.S. PATENT DOCUMENTS

| | | | |
|---|---|---|---|
| 3,903,663 | A | 9/1975 | Bainter et al. |
| 5,628,541 | A * | 5/1997 | Gardner .................... B60P 3/34 296/165 |
| 5,735,568 | A * | 4/1998 | Arnold .................... B62D 33/06 180/89.12 |
| 5,785,372 | A | 7/1998 | Glatzmeier et al. |
| 7,690,158 | B2 * | 4/2010 | Kelly .................... E04B 2/7429 52/145 |
| 9,598,120 | B2 * | 3/2017 | Ishii ........................ B32B 5/022 |
| 2009/0026196 | A1 * | 1/2009 | Leedekerken ......... B65D 85/68 220/1.5 |
| 2013/0252529 | A1 | 9/2013 | Baldsiefen et al. |
| 2015/0102631 | A1 | 4/2015 | Maclean |
| 2016/0304135 | A1 | 10/2016 | Schlumm et al. |

FOREIGN PATENT DOCUMENTS

| | | | | |
|---|---|---|---|---|
| CN | 205871835 U | 1/2017 | | |
| DE | 10 2008 005 010 A1 | 10/2008 | | |
| DE | 20 2010 011 050 U1 | 11/2011 | | |
| EP | 2 397 194 A2 | 12/2011 | | |
| EP | 2786922 A1 * | 10/2014 | ........... | B62D 29/048 |
| EP | 2 881 310 A2 | 6/2015 | | |
| JP | 2002-114043 A | 4/2002 | | |
| WO | 2005/100206 A1 | 10/2005 | | |
| WO | 2009/058003 A2 | 5/2009 | | |
| WO | WO-2009149778 A1 * | 12/2009 | ........... | B29C 70/30 |
| WO | 2014/178890 A1 | 11/2014 | | |
| WO | 2015/035455 A1 | 3/2015 | | |
| WO | WO-2015142189 A2 * | 9/2015 | ........... | A01K 1/0088 |

OTHER PUBLICATIONS

Chinese Office Action in CN201880015173.7 with Search Report, dated Apr. 25, 2021.

* cited by examiner

Fig.2

CABIN MODULE AND MOTOR VEHICLE EQUIPPED WITH SAME

CROSS REFERENCE TO RELATED APPLICATIONS

This application is the National Stage of PCT/EP2018/057471 filed on Mar. 23, 2018, which claims priority under 35 U.S.C. § 119 of Austrian Application No. A 50239/2017 filed on Mar. 24, 2017, the disclosure of which is incorporated by reference. The international application under PCT article 21(2) was not published in English.

The invention relates to a cabin module in the form of a self-supporting structural body as well as to a motor vehicle equipped with such a cabin module.

U.S. Pat. Nos. 3,496,689 A and 3,903,663 A each describe a covering for a bed of a motor vehicle made of a continuous sandwich panel by forming a V-shaped groove and bending along the groove produced. The sandwich panel comprises an inner layer attached to a core layer and an outer layer. Starting out from the inner layer, the V-shaped groove is produced in the direction towards the outer layer and the outer layer is kept uncut and continuous. The hence formed covering comprises several walls, namely a roof wall, two freely protruding lateral wall as well as, in a transition area between one lateral wall and the roof wall in each case, a transition wall extending in an inclined manner as seen in cross-section. The lateral walls are each supported on body parts rising laterally of the bed as seen in the driving direction and can also be fastened to these. The disadvantage of this is that for achieving shape stability of the covering, a body part carrying the load of the covering was always required.

The object of the present invention was to overcome the disadvantages of the prior art and to provide a cabin module in the form of a self-supporting structural body, by means of which a simpler vehicle construction can be realized. Moreover, a vehicle, in particular a motor vehicle, equipped with such a cabin module is to be created, too.

This object is achieved by the cabin module as well as by the motor vehicle equipped therewith according to the claims.

The cabin module according to the invention is designed in the form of a self-supporting structural body and in particular serves as a crew cabin for transporting persons to be accommodated therein in a motor vehicle, such as an emergency vehicle, a fire engine, a firefighting vehicle, a communal vehicle or a transport vehicle. The cabin module can at least comprise the following components:

- several walls, which at least sectionally delimit a cabin area, wherein
- the walls each comprise an inner layer facing the cabin area and an outer layer arranged at a distance therefrom, and
- the individual walls are formed of a continuous blank with a first end section and a second end section arranged at a distance thereof in the longitudinal extension of the blank, wherein
- in edge regions of walls arranged so as to directly follow one another, the outer layer is in each case designed to be continuous and deformed between walls arranged so as to directly follow one another in each case and the inner layer is designed to be interrupted by a separating section between the walls arranged so as to directly follow one another in each case and to be shortened with respect to the deformed outer layer, and withal at least one first lateral wall, a base wall, a second lateral wall as well as a roof wall are provided, said walls being formed of the continuous blank,
- the first end section of the blank is connected to the second end section of the blank in a joint area, and
- the walls form the self-supporting structural body in the form of a hollow body.

The advantage achieved by this consists in that by means of the walls that are continuous in the cross-section and hence across the circumference with respect to the hollow body, a stable and in itself supporting structural body for forming the cabin module can be created. Owing to the fact that the walls themselves are formed of an inner layer and an outer layer arranged at a distance thereof, these have a high inherent rigidity from the outset. By separating individual separating sections in the region of the inner layer and the continuous maintenance of the outer layer, hence, from an initially planar continuous blank, by erecting the walls towards one another, a stable and easy to produce structural body can be created as the supporting base construction of the cabin module. By mutually connecting the end sections arranged at a distance from one another in the longitudinal extension of the blank in the extended position, stable cohesion of the structural body can also be achieved in the mutual connection area of the two end sections. By means of the respective position and selection of the separating sections to one another, the dimensions of the cabin module can be easily adjusted to the respective requirements. Merely a sufficiently extended length of the blank for the formation of the cabin module is to be provided and depending on the wall dimensions to be produced, the respective separating sections are to be incorporated into the blank in the region of the inner layer. The blank in its longitudinal extension between the two end sections always stays a continuous component, from which the circumferential walls of the cabin module can be formed. Hence, the mutual erection effort and/or the mutual orientation effort when assembling the walls to the cabin module can be significantly reduced, as the walls merely have to be moved into the predefined angular position with respect to one another.

It can further be advantageous if the joint area of the end sections facing one another is arranged in one of the edge regions of the self-supporting structural body. By arranging the joint area in one of the edge regions, here, an easy mutual connection of the respective end sections of the blank facing one another to the hollow-body-shaped or tube-shaped structural body can be carried out as well.

Another embodiment is characterized in that the separating section of the inner layer is oriented extending in perpendicular direction with respect to the longitudinal extension of the blank between its two end sections. Hence, an easy mutual, circumferential parallel orientation of the individual walls with respect to one another can be created.

In another possible design, it is provided for that in at least one of the walls, at least in its inner layer, at least one recess, in particular a groove or a slot, is formed, and the at least one recess is oriented extending in perpendicular direction with respect to the longitudinal extension of the blank. Hence, already during the preparation of the blank still as a component lying flat, the subsequently required holding and mounting points can be easily formed on the inner layer facing the inside of the cabin module. By the additional partial removal of at least the inner layer, hence, mounting points or mounting regions can be created, on which for example handholds, luminous elements or other mounting points or anchor points or anchor hooks for pieces of equipment, tools or the like can be placed or held. By working off and partially removing the inner layer, hence, a slight overlap over the inner layer in the direction towards the cabin area can be achieved or even a complete accommodation of the previously described components in the recess can be effected. Hence, such add-on components can be accommodated in the height of the hollow profile.

Another possible embodiment has the characteristics that the continuous blank is assembled of several hollow profiles, said hollow profiles being arranged next to one another in transverse direction with respect to the longitudinal extension of the blank between its two end sections and being connected, in particular coupled, to one another on longitudinal sides facing one another. By assembling the blank of several hollow profiles arranged next to one another, hence, on the one hand the constructional width of the cabin module to be manufactured and on the other hand the dimension of the enclosed cabin module can be easily and cost-effectively adapted to diverse application conditions. By mutually connecting and arranging several hollow profiles next to another, hence, standard profiles, from which the planar blank is first formed, can be reverted to. From these, by mounting a corresponding number of separating sections depending on the walls to be produced, the self-supporting structural body can later be formed.

In a further design, it is provided for that the outer layer and the inner layer of the individual hollow profiles are in each case distanced from one another by means of at least one web, preferably by means of several webs. By mutually connecting the outer layer and the inner layer, hence, the inherent stability and rigidity of the hollow profile can be additionally improved.

A further embodiment is characterized in that the inner layers designed so as to be interrupted in the separating section in each case are connected to one another, in particular connected to one another in a materially bonded manner, by walls arranged so as to directly follow one another in an inner edge region facing the cabin area. Hence, also in the inner edge region, despite the previously separated and sectionally removed inner layer, a stable cohesion and an improved inherent rigidity of the cabin module to be produced can be created again.

A further preferred embodiment is characterized in that the at least one insulation element is provided, said at least one insulation element being arranged in at least one hollow chamber formed between the outer layer and the inner layer of the hollow profile. Hence, an improved sound and/or heat insulation of the cabin module can be achieved. The proofing and/or insulation element can also serve for sound absorption and/or for increasing the penetration resistance in case of fire with weapons or other objects such as stones, bottles or other projectiles. Moreover, hence, depending on the selection and inherent rigidity of the insulation element(s), the total inherent rigidity can be additionally improved. The insulation element can for example be formed by means of a foam material inserted into the hollow area or the hollow chamber.

It can further be advantageous if in at least one of the lateral walls and/or in the base wall and/or in the roof wall, at least one breakthrough is arranged or formed and the at least one breakthrough penetrates both the outer layer and the inner layer. Hence, mounting of the cabin module to the chassis or the driver's cabin can be easily facilitated or depending on the requirement and intended use, an accommodation area for a viewing window, a communication opening, a roof hatch or the like can be created. If a breakthrough is provided for in the roof wall, an outwardly displaceable roof window or even an access opening can be formed. Moreover, an air conditioner and/or a filter module for filtered supply of fresh air could be arranged as a roof extension and hence, an access via the breakthrough in the roof wall into the cabin area could be created.

Another alternative embodiment is characterized in that a door arrangement and/or a window arrangement and/or a shutter arrangement is provided on at least one end face of the hollow-body-shaped or the tunnel-shaped structural body. Hence, lateral closing of the hollow-body-shaped supporting structural body can be performed so as to allow for forming an entirely enclosed cabin module.

A further possible and optionally alternative embodiment has the characteristics that the blank, in particular its hollow profiles, is formed of a metal material and/or a plastic material and/or a combination thereof. Hence, standard products, which are available at low cost, can easily be reverted to for producing the blank.

In a further design it is provided for that a light metal or a light metal alloy is selected as the metal material. Hence, weight saving can be achieved with high inherent stability and inherent rigidity of the supporting structural body.

However, the invention also relates to a motor vehicle, in particular an emergency vehicle, a fire engine, a communal vehicle, a transport vehicle, comprising a chassis, a driver's cabin and at least one cabin module, an undercarriage with at least one front wheel arrangement and at least one back wheel arrangement, and a power plant, with at least one cabin module formed according to the invention is used as the self-supporting structural body and the cabin module either being held on the undercarriage or being mounted on the driver's cabin thereon, in particular mounted on the driver's cabin in a positively locked manner By arranging or mounting the cabin module on the motor vehicle, hence, the installation effort can be reduced and thereby, an even more economic fabrication can be allowed for.

A possible embodiment is characterized in that a longitudinal extension of the hollow-body-shaped or the tunnel-shaped structural body is oriented extending from a left side of the vehicle to a right side of the vehicle as seen in the driving direction. Thereby, a cabin module formed continuously in the direction of the vehicle width can be created, in which merely on its lateral end faces in each case as needed diverse door and/or window arrangements can be arranged easily and hence the cabin area can be enclosed from all sides.

Lastly, a design of the motor vehicle can be advantageous in which at least one line is arranged or accommodated within at least one wall of the self-supporting structural body between an inner layer and an outer layer arranged at a distance thereof. Hence, additional arrangement of cable channels can for the most part be refrained from. Moreover, hence, a secure, protected line run can be achieved in the region of the cabin module.

For the purpose of better understanding of the invention, it will be elucidated in more detail by means of the figures below.

These show in a respectively very simplified schematic representation.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

The term "particularly/in particular" is hereinafter understood such that it may refer to a possible, more specific embodiment and more detailed specification of a subject matter or a method step, but does not necessarily have to represent an obligatory, preferred embodiment of the latter or an obligatory approach.

Figure 1:
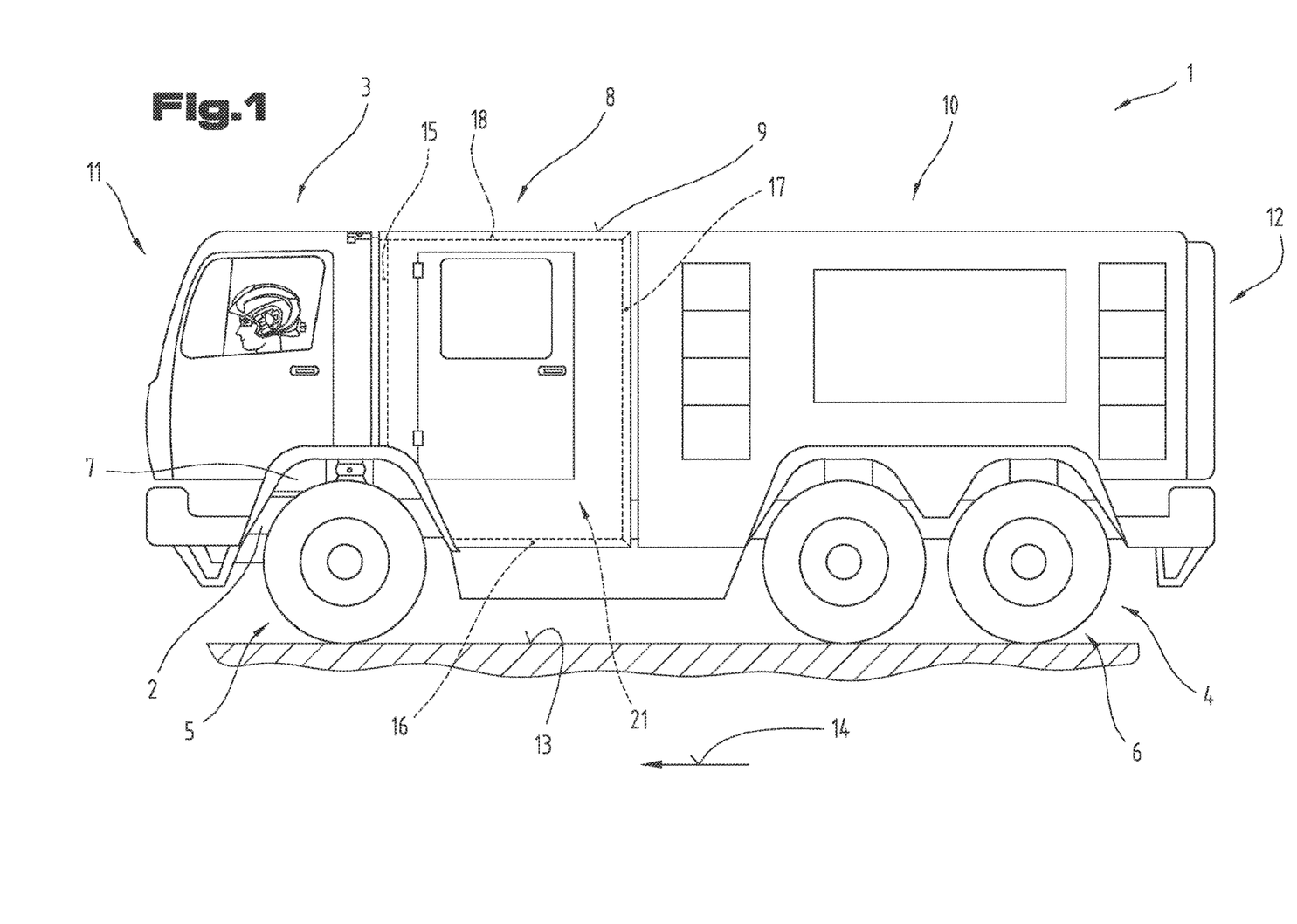
FIG. 1 a motor vehicle with a cabin module in a lateral view and in simplified, stylized representation.

FIG. 1 shows a motor vehicle 1 in a simplified side view. The motor vehicle 1 can for example serve as an emergency vehicle, a fire engine, a communal vehicle or a transport vehicle. Preferably, the motor vehicle 1 is formed as a motortruck and can comprise a chassis 2, a driver's cabin 3 arranged on the front side thereof as well as an undercarriage 4 with at least one front wheel arrangement 5 and at least one back wheel arrangement 6. Each of the wheel arrangements 5, 6 can comprise single wheels on both sides or dual wheels. It would also be possible to provide one or several axles in each of the wheel arrangements 5, 6. A schematically adumbrated power plant 7 can serve as a drive.

Generally, the supporting parts of vehicles, in particular of motor vehicles 1, are referred to as chassis 2, frame, carriage or underframe. The supporting parts have the function of carrying the drive, the body and optionally the payload.

Generally, all parts of a land vehicle serving the connection of the chassis 2 to the lane via the wheels are referred to as undercarriage 4. The undercarriage 4 ranks among the main components of the motor vehicle 1. It can comprise wheels, wheel carriers, wheel bearings, brakes, wheel suspensions, subframes, suspension including stabilizer, damping and steering.

As seen in the driving direction 14, following the driver's cabin 3—i.e. in the direction towards the rear end—at least one cabin module 8 is provided. The usual driving direction 14 is marked with an arrow in a forward motion of the motor vehicle 1. The cabin module 8 is designed in the form of a self-supporting structural body 9 and can be arranged directly on the chassis 2 without additional carriage or reinforcement elements and be held stationarily positioned thereon. For damping, further damping and/or spring elements, which are, however, not shown in detail, can be provided additionally. Irrespective thereof, it would also be possible that the cabin module 8 is arranged directly on the driver's cabin 3 or mounted thereto. Hence, a double cabin can be formed so as to hence form a compound constructional unit of the driver's cabin 3 and the cabin module 8.

The cabin module 8 can also be referred to just as cabin or as cabin extension module.

Following the cabin module 8, a vehicle body 10 can be arranged or provided. Therein, diverse receiving compartments and/or receiving boxes can be provided, so as to allow for transporting the required equipment objects, tools and much more in case of an emergency. For this purpose, the receiving compartments and/or receiving boxes can be closed for transport by means of doors, shutters or other closing elements and made accessible when needed.

To provide a better overview, the representation of other units and/or components was refrained from.

The motor vehicle 1 comprises a front side 11 and a rear side 12 distanced thereof in the longitudinal direction of the vehicle, whereby a constructional length and/or vehicle length is defined. It is further shown here that the motor vehicle 1 is placed on and/or supported on a preferably horizontally oriented support surface 13.

Figure 2:
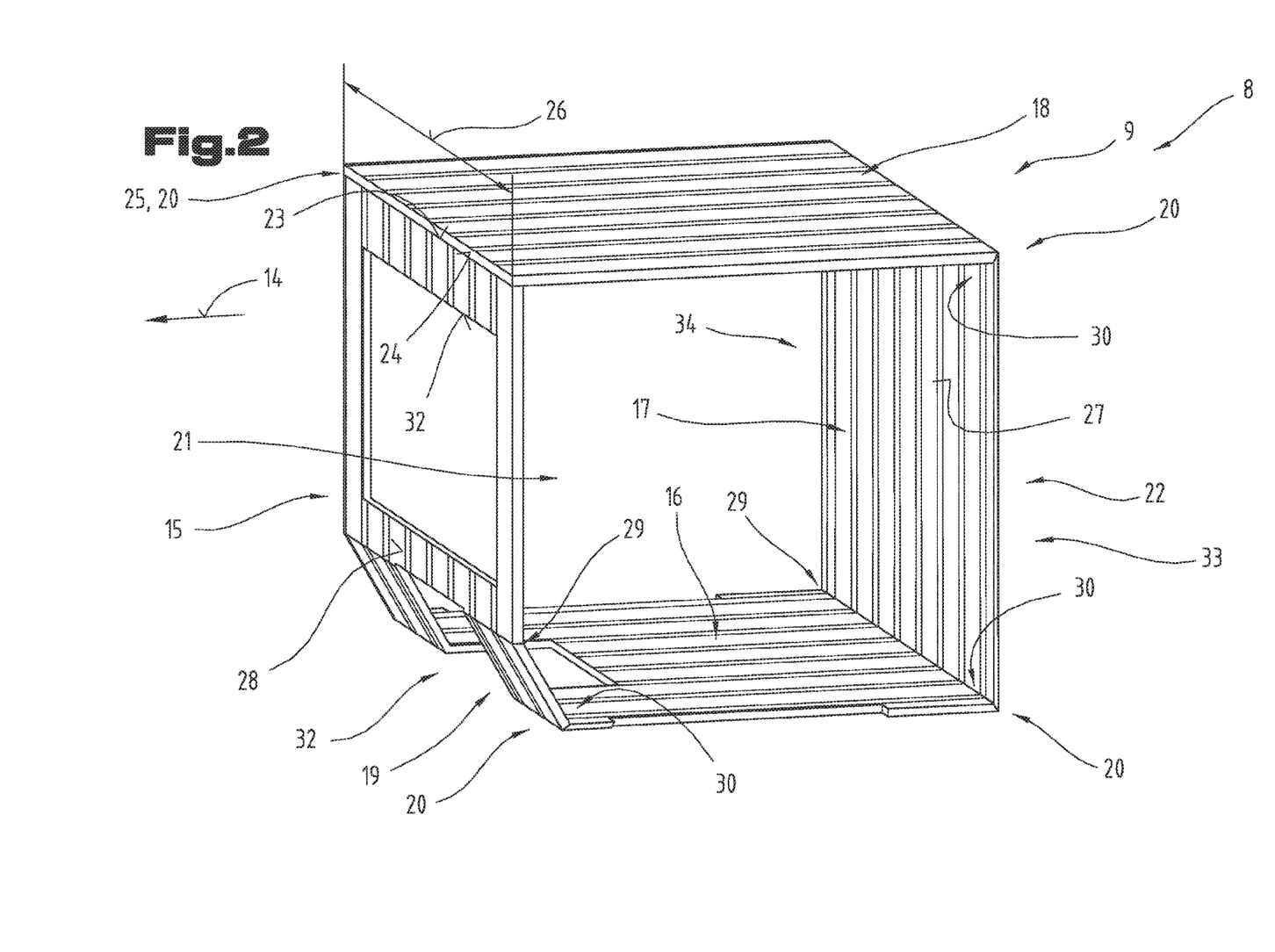
FIG. 2 a possible design of a cabin module in sole diagrammatic representation.
Figures 3, 4:
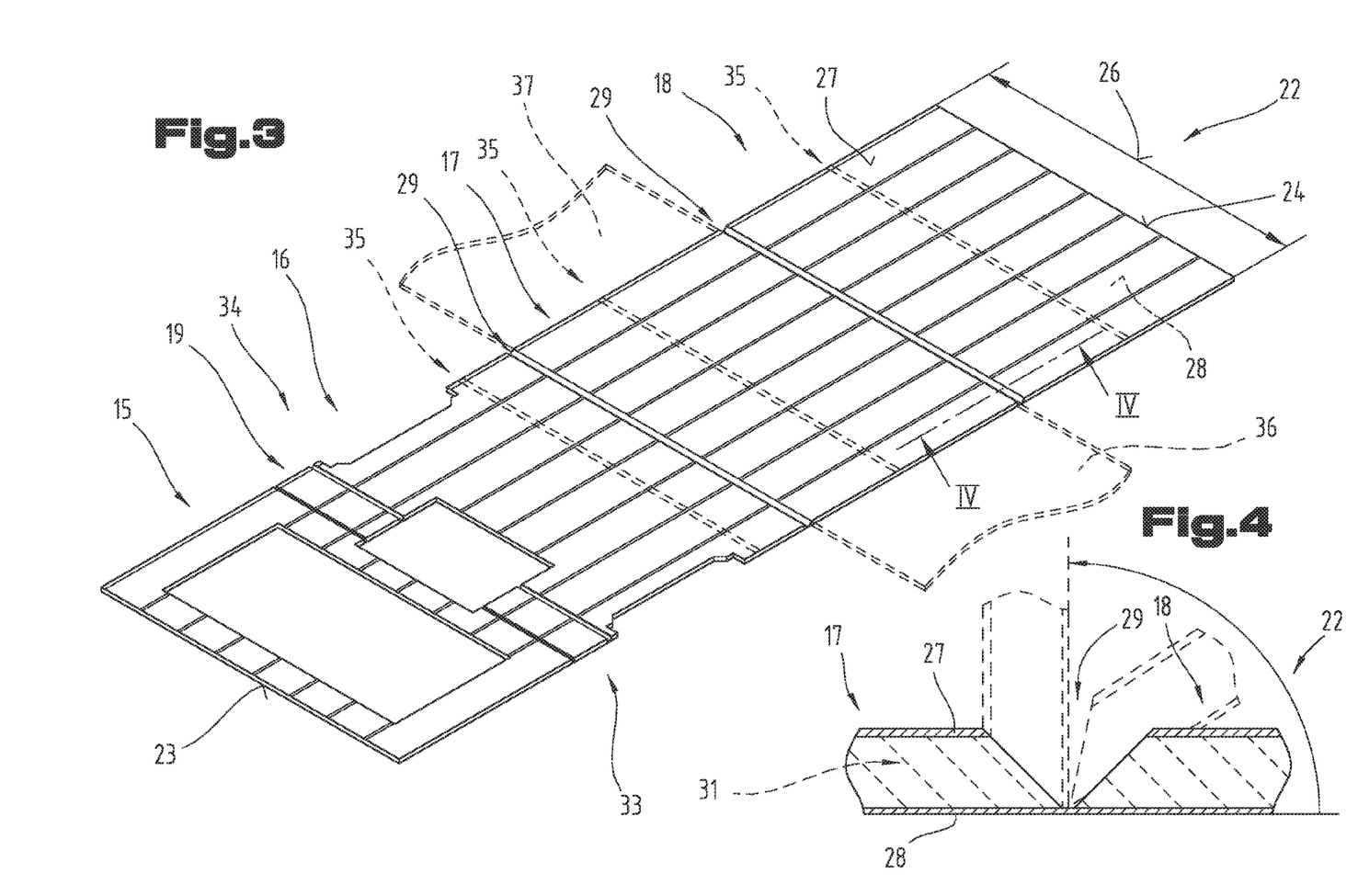
FIG. 3 the blank for forming the cabin module according to FIG. 2 in an extended, undeformed position of the individual walls to one another and in diagrammatic representation.
FIG. 4 a detail of the blank in the region of an edge region to be formed in a side view section according to lines IV-IV in FIG. 3 and in an enlarged representation.

In FIGS. 2 to 4, the cabin module 8 is shown solely in a possible design and in this exemplary embodiment comprises at least one first lateral wall 15, a base wall 16, a second lateral wall 17 as well as a roof wall 18. Additionally, it is shown that the first lateral wall 15 with its end facing the base wall 16 can be formed as a slant wall 19, which can enclose an angle of larger than 90° up to 180° with the remainder of the first lateral wall 15. Preferably, the first lateral wall 15 later faces the front side 11 of the motor vehicle 1 as seen in the driving direction 14 and the second lateral wall 17 faces the rear side 12 thereof. Thus, the first lateral wall 15 can also be referred to as front wall and the second lateral wall 17 can also be referred to as rear wall of the cabin module 8.

Preferably, walls 15 to 18 directly adjoining in an edge region 20 and facing one another in each case enclose an angle of 90° between them. A cabin area 21 is at least sectionally delimited by the individual walls 15 to 18 in the circumferential direction and thus viewed in their circumferential longitudinal extension.

As can better be seen from FIGS. 2 and 3, the individual walls 15 to 18 are formed of a single continuous blank 22. The blank 22 as viewed in the direction of its longitudinal extension comprises a first end section 23 and a second end section 24 spaced therefrom and arranged at a distance thereof. In the position of the walls 15 to 18 of the blank 22 forming the cabin area 21, the first end section 23 faces the second end section 24 and is also connected to the second end section 24 forming a joint area 25. This mutual connection of the two end sections 23, 24 could be effected by means of a materially bonded connection, such as a welding operation, a soldering operation or another adhesion operation. For example, a weld seam with or without an additional material could be formed. Laser welding could also be carried out. Irrespective thereof or additionally to this, it would also be possible to connect the two end sections 23, 24 to one another in one of the edge regions 20 forming the joint area 25 between two adjacent walls, in the present exemplary embodiment between the first lateral wall 15 and the roof wall 18, in a form-fitted and/or force-fitted manner by means of an edge attachment profile. In addition to this, bonding of the edge attachment profile with the adjacent walls 15, 18 can be carried out.

The arrangement of the joint area 25 can be provided for in each one of the individual edge regions 20. Depending thereof, the order of the individual walls 15 to 18 on the blank 22 is to be arranged. In the shown, present exemplary embodiment, the first end section 23 is arranged on the first lateral wall 15 and the second end section 24 is arranged on the roof wall 18. In this regard, the roof wall 18 lies supported on a front surface of the first lateral wall 15 in the region of the first end section 23.

However, it would also be possible to arrange the joint area 25 for example in the edge region 20 between the base wall 16 and the second lateral wall 17. However, irrespective thereof, the joint area 25 could also be arranged or formed between the first lateral wall 15 and the base wall 16 or between the second lateral wall 17 and the roof wall 18. Furthermore, the joint area 25 could also be arranged to extend directly in one of the walls 15 to 18.

The following description of the formation of the blank 22 and the arrangement of the joint area 25 refers to its arrangement between the first lateral wall 15 and the roof wall 18.

A width 26 of the blank 22 in perpendicular direction with respect to its longitudinal extension later forms a cabin width as viewed in transverse direction with respect to the driving direction 14.

The blank 22 and thus also the walls 15 to 18 formed thereof comprise an inner layer 27 facing the cabin area 21 and an outer layer 28 arranged at a distance thereof. In edge regions 20 to be formed between walls 15, 16; 16, 17; 17, 18 provided on the blank 22 in each case directly following one another and to be formed subsequently, the outer layer 28 is in each case designed to be continuous and subsequently deformed between walls 15, 16; 16, 17; 17, 18 arranged so as to directly follow one another in each case. A breakthrough or a penetration in one of the edge regions 20 could represent an exception thereof.

So as to displace the individual walls 15 to 18 onto one another in their ends facing one another and later forming the edge region 20 due to their wall thickness and the continuously formed outer layer 28 in the respective edge region 20 from the extended undeformed position, a groove-shaped recess with a V-shaped cross-section is to be formed starting out from the inner layer 27 in the direction towards the outer layer 28. This is shown in simplified form in FIG. 4.

The groove-shaped recess with its two groove side faces running towards one another preferably ends on an inner surface of the outer layer 28 facing the inner layer 27. In known manner, the angle enclosed by the groove side faces is to be selected to be so large that it is equal to the angle enclosed by the walls 15 to 18 in the erected position of the walls 15 to 18. For this purpose, the respective inner layer 27 is to be designed to be shortened on both sides of the bending region of the outer layer 28. In the course of this, a separating section 29 forms in the inner layer 27 between walls 15 to 18 arranged so as to directly follow one another. The separating section(s) 29 of the inner layer 27 are preferably oriented so as to extend in perpendicular direction with respect to the longitudinal extension of the blank 22 between its two end sections 23, 24.

Thus, for forming the edge region(s) 20, the outer layer 28 can be continuous, but deformed along a bending line.

When the walls 15 to 18 that are still connected by means of the outer layer 28 are erected towards the self-supporting structural body 9, these form a hollow body delimited by the walls 15 to 18 as seen in the cross-section. The hollow body can also be referred to as hollow cuboid, which forms or delimits a kind of tunnel.

It is further provided for in this regard, that the aforedescribed joint area 25 is arranged between the two end sections 23, 24 facing one another in one of the edge regions 20 of the self-supporting structural body 9. However, as was described above, it could also be arranged on another one of the edge regions 20.

The continuous blank 22 can preferably be assembled of several hollow profiles. In this regard, the individual hollow profiles are arranged next to one another in transverse direction with respect to the longitudinal extension of the blank 22 between its two end sections 23, 24 and are connected to one another, in particular coupled to one another, on longitudinal sides facing one another in each case. This can be carried out on a positively locked basis, as is known for such hollow profiles. The longitudinal extension of the individual hollow profiles thus also extends in parallel direction with respect to the longitudinal extension of the blank 22 between its two end sections 23, 24.

For strengthening and reinforcing the blank 22, in particular the individual hollow profiles, the outer layer 28 and the inner layer 27 can be distanced from one another by means of at least one web extending in between these and thus be positioned relative to one another. However, preferably, several webs are provided on each one of the hollow profiles. The orientation of the webs between the inner layer 27 and the outer layer 28 can be selected as desired as seen in the cross-section of the hollow profile.

In individual ones of the walls 15 to 18, in transverse direction with respect to the longitudinal extension of the blank 22, in particular transversely to its hollow profiles, additional recesses 35 such as grooves (transverse grooves) or slots, can be incorporated, in particular milled, at least into the inner layer 27, which can serve for the later accommodation of seat boxes, anchor points for seat belts or holders of compressed air breathing apparatuses. If longitudinal webs are provided within the space between the inner layer 27 and the outer layer 28, these are also to be worked off or removed in the region of the recesses 35. In the recesses 35 such as grooves (transverse grooves) or slots, mounting means such as anchor screws can be inserted and be displaced or moved to the required mounting point to be formed as needed. Hence, the restraining forces starting out from the respective mounting means can be incorporated in the supporting structure of the cabin module 8. The at least one recess 35 can be oriented to extend in perpendicular direction with respect to the longitudinal extension of the blank 22.

In order to achieve a high inherent stability and so as to be able to form the self-supporting cabin module 8 as a connected structural body 9, the inner layers 27 of the walls 15 to 18 arranged so as to directly follow one another that were previously separated in the separating sections 29 are to be connected to one another in an inner edge region 30 facing the cabin area 21 in each case. This can be carried out by means of additional connecting angles and/or by means of a materially bonded connection, such as a welding operation, a soldering operation or a bonding operation, not represented in further detail. For example, a weld seam with or without an additional material could be formed. Laser welding could also be carried out.

For achieving a better sound and/or heat insulation of individual ones of the walls 15 to 18, at least one insulation element 31 can be provided. The at least one insulation element 31 can be held in a hollow chamber formed between the outer layer 28 and the inner layer 27 and be arranged therein. If the walls 15 to 18 are formed of several hollow profiles, several insulation elements 31 can be held in their respective hollow chambers and be arranged therein.

Depending on the selection of the insulation material, the insulation material could for example be inserted, in particular injected, into the hollow area or the hollow chambers formed between the inner layer 27 and the outer layer 28 as a foam mass. The insertion can for example be carried out in one of the edge regions 20 to be formed in the region of the formed separating sections 29. Hence, an already existing access into the space between the inner layer 27 and the outer layer 28 can simple be used without additional openings having to be created.

Between the inner layer 27 and the outer layer 28 and thus within the hollow profile or with at least one hollow chamber thereof, line(s) of diverse types can be arranged or held. These can be electric lines, lines for diverse fluid media or lines for extinguishing agents or the like. It would also be possible to directly conduct a flowable medium through within a hollow profile and/or a hollow chamber thereof. In order to create an access and/or an outlet to or from the hollow profile and/or a hollow chamber, openings not represented and designated in further detail are to be provided in the inner layer 27 and/or the outer layer 28.

Moreover, at least one breakthrough 32 can be arranged or formed in at least one of the walls 15 to 18. The at least one breakthrough 32 entirely penetrates both the outer layer 28 and the inner layer 27 and can serve for the accommodation or formation of a window, a viewing opening, a communication opening, a roof hatch or a component of the motor vehicle 1.

When the cabin module 8 is located in its setup position on the chassis 2, the longitudinal extension of the blank 22 is oriented to extend in parallel direction with respect to the driving direction 14. The cabin module 8 is, in each case on the edges and thus in the region of longitudinal edges distanced from one another by the width 26, limited by a left end face 33 and a right end face 34 with respect to the driving direction 14. In this case, the hollow body or the hollow-profile-shaped structural body 9 has a longitudinal extension which is oriented to extend from a left side of the vehicle to a right side of the vehicle.

A door arrangement and/or a window arrangement and/or a combination thereof and/or a shutter arrangement can be provided on at least one of the end faces 33 and/or 34 of the hollow-body-shaped structural body 9. Additional panelings and/or covering elements can also be provided in the region of the end faces 33 and/or 34. It would further also be possible to additionally arrange or mount a covering element on the outer layer 28 of at least individual ones of the walls 15 to 18, to hence form a possible protective element or a forming structure for the structural body from the hollow profiles.

By means of the additional panelings and/or covering elements, the transversal stability of the structural body 9 as viewed in the driving direction 14 can be further increased and improved. Hence, relative displacements of the roof wall 18 with respect to the base wall 16 can be reduced and thus torsions of the structural body 9 in driving operation can also be reduced.

If the walls 15 to 18 are assembled of several hollow profiles, these can be formed of a metal material and/or a plastic material and/or of metallized materials combined with a plastic material. However, several materials different from one another can also be combined and for example, a composite profile or a composite material can be used for the formation of the blank 22. Moreover, for example fiber-reinforced plastic materials or fiber composites can also be used.

The hollow profiles of the metal material can be manufactured in an extrusion molding process. Those of the plastic material can be manufactured in an extrusion operation. It would also be possible to arrange or insert the afore-described insulation element(s) 31 directly in the course of the manufacturing process of the respective hollow profile therein.

Preferably, light metals and/or light metal alloys are used as metal materials.

However, additionally, a left lateral wall 36 and/or a right lateral wall 37 could also be provided, which also form or represent a single-piece component of the blank 22. This is by way of example adumbrated in FIG. 3 laterally besides the second lateral wall 17 in the region of the left end face 33 as well as of the right end face 34 of the blank 22 in each case. However, the lateral walls 36 and/or 37 can also be arranged on the other walls directly adjoining these laterally. This is to be realized in the design of the blank 22 from several hollow profiles arranged next to one another. Hence, the cabin module 8 can be formed as a hollow cuboid from the blank 22 with provision of the left and right side walls 36 and 37. The mutual connection between the individual walls 15 to 18, 19, 36 and 37 can be materially bonded by means of a welding operation, a bonding operation or by means of edge attachment profiles.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

| | |
|---|---|
| 1 | motor vehicle |
| 2 | chassis |
| 3 | driver's cabin |
| 4 | undercarriage |
| 5 | front wheel arrangement |
| 6 | back wheel arrangement |
| 7 | power plant |
| 8 | cabin module |
| 9 | structural body |
| 10 | vehicle body |
| 11 | front side |
| 12 | rear side |
| 13 | support surface |
| 14 | driving direction |
| 15 | first lateral wall |
| 16 | base wall |
| 17 | second lateral wall |
| 18 | roof wall |
| 19 | slant wall |
| 20 | edge region |
| 21 | cabin area |
| 22 | blank |
| 23 | first end section |
| 24 | second end section |
| 25 | joint area |
| 26 | width |

| | |
|---|---|
| 27 | inner layer |
| 28 | outer layer |
| 29 | separating section |
| 30 | inner edge region |
| 31 | insulation element |
| 32 | breakthrough |
| 33 | left end face |
| 34 | right end face |
| 35 | recess |
| 36 | left lateral wall |
| 37 | right lateral wall |

The invention claimed is:

1. A cabin module in the form of a self-supporting structural body, comprising
at least one first lateral wall, a base wall, a second lateral wall, and a roof wall, which at least sectionally delimit a cabin area, wherein
the at least one first lateral wall, the base wall, the second lateral wall, and the roof wall each comprise an inner layer facing the cabin area, and an outer layer arranged at a distance therefrom, and
are formed of a continuous blank with a first end section and a second end section arranged at a distance thereof in a longitudinal extension of the blank,
wherein the cabin area has a cabin width perpendicular with respect to said longitudinal extension of the blank,
wherein in edge regions of the at least one first lateral wall, the base wall, the second lateral wall, and the roof wall arranged so as to directly follow one another, the outer layer is designed to be continuous and deformed between the at least one first lateral wall, the base wall, the second lateral wall, and the roof wall arranged so as to directly follow one another and the inner layer is designed to be interrupted by a separating section between the at least one first lateral wall, the base wall, the second lateral wall, and the roof wall arranged so as to directly follow one another and to be shortened with respect to the deformed outer layer,
wherein the first end section of the blank is connected to the second end section of the blank in a joint area,
wherein the at least one first lateral wall, the base wall, the second lateral wall, and the roof wall form the self-supporting structural body in the form of a hollow body, and
wherein the continuous blank is assembled of several hollow profiles, each of said hollow profiles comprising a section of the at least one first lateral wall, the base wall, the second lateral wall, and the roof wall, said hollow profiles being arranged next to one another in the parallel direction with respect to the cabin width and said hollow profiles being arranged such that a longitudinal extension of each of said hollow profiles extends in parallel with respect to the longitudinal extension of the blank.

2. The cabin module according to claim 1, wherein the two end sections face one another and have a joint area arranged in one of the edge regions of the self-supporting structural body.

3. The cabin module according to claim 1, wherein the separating section of the inner layer is oriented extending in a parallel direction with respect to the cabin width.

4. The cabin module according to claim 3, wherein in at least one of the at least one first lateral wall, the base wall, the second lateral wall, and the roof wall, at least in its inner layer, at least one recess is formed, and the at least one recess is oriented extending in the parallel direction with respect to the cabin width.

5. The cabin module according to claim 1, wherein said hollow profiles are connected to one another on longitudinal sides facing one another transverse to the parallel direction with respect to the cabin width.

6. The cabin module according to claim 5, wherein each of said hollow profiles comprises a section of the outer layer and the inner layer distanced from one another by of at least one web.

7. The cabin module according to claim 6, wherein the edge regions comprise an inner edge region facing the cabin area and wherein the inner layers designed so as to be interrupted in the separating section are connected to one another in the inner edge region facing the cabin area.

8. The cabin module according to claim 5, wherein each of the hollow profiles has at least one hollow chamber formed between the outer layer and the inner layer and wherein at least one insulation element is arranged in the at least one hollow chamber formed between the outer layer and the inner layer (27) of the hollow profile.

9. The cabin module according to claim 1, wherein in at least one of the first and second lateral walls or in the base wall or in the roof wall, at least one breakthrough is arranged or formed and the at least one breakthrough penetrates both the outer layer and the inner layer.

10. The cabin module according to claim 1, wherein a door arrangement or a window arrangement or a shutter arrangement is provided on at least one end face of the hollow-body-shaped structural body.

11. The cabin module according to claim 1, wherein the blank is formed of a metal material or a plastic material or a combination thereof.

12. The cabin module according to claim 11, wherein a light metal or a light metal alloy is selected as the metal material.

13. A motor vehicle, comprising a chassis, a driver's cabin and at least one cabin module, an undercarriage with at least one front wheel arrangement and at least one back wheel arrangement, and a power plant, wherein the at least one cabin module is formed as a self-supporting structural body according to claim 1 and is either held on the undercarriage or mounted on the driver's cabin thereon.

14. The motor vehicle according to claim 13, wherein the hollow-body-shaped structural body is has a width extending from a left side of the vehicle to a right side of the vehicle as seen in the driving direction.

15. The motor vehicle according to claim 13, wherein at least one line is arranged or accommodated within at least one of the at least one first lateral wall, the base wall, the second lateral wall, and the roof wall of the self-supporting structural body between said inner layer and said outer layer arranged at a distance from the inner layer and the outer layer.

* * * * *

UNITED STATES PATENT AND TRADEMARK OFFICE
CERTIFICATE OF CORRECTION

PATENT NO. : 11,167,159 B2
APPLICATION NO. : 16/488691
DATED : November 9, 2021
INVENTOR(S) : Kmetec Danilo Page 1 of 1

It is certified that error appears in the above-identified patent and that said Letters Patent is hereby corrected as shown below:

In the Claims

In Column 12, Line 26 (Claim 8) after "layer" delete "(27)"
In Column 12, Line 51 (Claim 14) after "body" delete "is"

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*